United States Patent [19]

Nakai et al.

[11] Patent Number: 4,973,982

[45] Date of Patent: Nov. 27, 1990

[54] MULTI-STYLUS RECORDING HEAD OF A PRINTER

[75] Inventors: Syunzi Nakai, Moriguchi; Hiroshi Ishii, Kashihara; Kazutaka Abe, Tenri; Yukihiro Mizumoto, Tenri; Fumihiko Takemoto, Tenri, all of Japan

[73] Assignee: Sharp Kabushiki Kaisha, Osaka, Japan

[21] Appl. No.: 154,427

[22] Filed: Feb. 5, 1988

Related U.S. Application Data

[63] Continuation of Ser. No. 867,794, May 23, 1986, abandoned.

[30] Foreign Application Priority Data

| | | | |
|---|---|---|---|
| Jun. 11, 1985 | [JP] | Japan | 60-128662 |
| Nov. 7, 1985 | [JP] | Japan | 60-250243 |
| Dec. 19, 1985 | [JP] | Japan | 60-287114 |

[51] Int. Cl.⁵ .......................... G01D 15/10; H05B 1/00

[52] U.S. Cl. ............................... 346/76 PH; 346/155; 219/216; 338/309

[58] Field of Search .......................... 346/76 PH, 155; 219/216, 593; 338/308, 309

[56] References Cited

U.S. PATENT DOCUMENTS

| | | | |
|---|---|---|---|
| 2,730,597 | 1/1956 | Podolsky et al. | 338/308 |
| 4,160,897 | 7/1979 | Makino | 219/543 |
| 4,636,813 | 1/1987 | Mego et al. | 346/76 PH |

FOREIGN PATENT DOCUMENTS

| | | | |
|---|---|---|---|
| 60-174664 | 9/1985 | Japan | 400/120 |
| 60-199669 | 10/1985 | Japan | 400/120 |
| 60-214972 | 10/1985 | Japan | 400/120 |

*Primary Examiner*—Bruce A. Reynolds
*Assistant Examiner*—Gerald E. Preston
*Attorney, Agent, or Firm*—Flehr, Hohbach, Test, Albritton & Herbert

[57] ABSTRACT

A recording head for a printer is manufactured by printing a thick film of paste containing an electrode material such as tungsten on a ceramic substrate with hardness nearly equal to or less than that of tungsten and firing the substrate and the film simultaneously in a single process.

4 Claims, 2 Drawing Sheets

MULTI-STYLUS RECORDING HEAD OF A PRINTER

Figure 1:
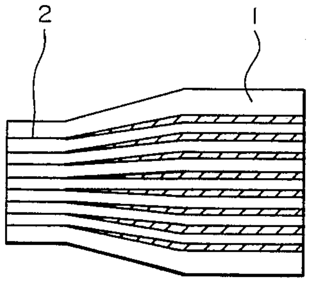

This is a continuation of application Ser. No. 867,794 filed May 23, 1986, now abandoned.

This invention relates to a recording head of electrothermic printing apparatus and more particularly to a multi-stylus thermal recording head of a printer which causes its electrodes to contact the resistive layer of a film and currents to flow therethrough to heat the resistive layer and to melt and transfer ink in the ink layer of the film onto a sheet of ordinary print paper.

Printing is effected by an electrothermic printing apparatus by causing electric currents to flow through a transfer film by means of a recording head with a plurality of recording needles. With the recent requirement for improved printing quality, it is becoming necessary to set these recording needles at a very high density in a recording head. Densities of over 8–10 needles/mm are commonly considered necessary. Generally, a recording head is fabricated by arranging a plurality of tungsten wires. In order to increase the density of recording needles, however, individual recording needles must be made smaller although there are many problems in the technology of manufacturing miniaturized components like the mechanism for supporting the needles. There are also problems to be considered concerning their strength, useful lifetime, etc.

One of the means to increase the density of recording needles in a recording head has been to use an adhesive to attach a layer of tungsten foil on a flexible polyimide substrate and to form recording electrodes by an etching process. Recording heads manufactured by this method, however, are not satisfactory. Since the recording electrodes are supported only by an adhesive and since the width of electrodes is only about 0.05 mm, the areas of contact are small and hence the support for the electrodes is extremely weak. This frequently causes recording electrodes to fall off at the time of printing or cleaning.

It is therefore an object of the present invention to provide an easier method of manufacturing a recording head.

It is another object of the present invention to provide a method of manufacturing a recording head with more strongly supported recording electrodes.

The above and other objects of the present invention are achieved by a method of manufacturing a recording head comprising the steps of printing upon a substrate a thick film of paste containing an electrode material such as tungsten or a combination of tungsten and molybdenum and forming electrodes by a firing process. The substrate is preferably of a ceramic material of hardness approximately equal to or less than that of the electrode material. The material may be forsterite ($Mg_2SiO_4$) or mullite ($Al_6Si_2O_{13}$) which has not been fired. Sintering of this layer and firing of the electrode material layer should preferably be done simultaneously in a single process.

Figure 2:
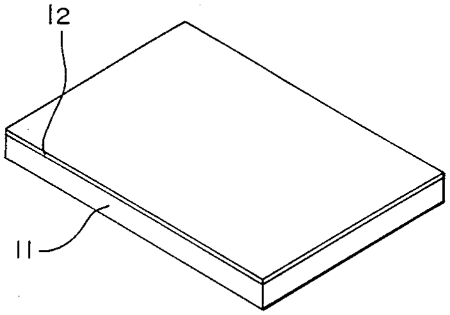
Figure 3:
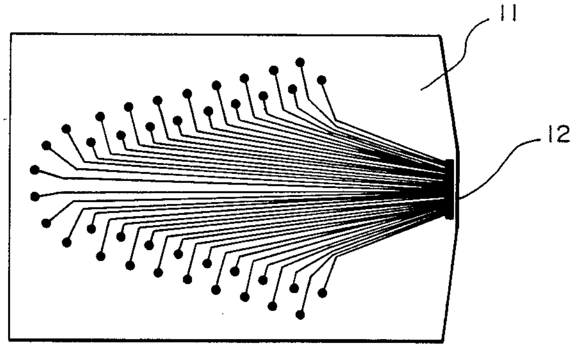
Figure 4:
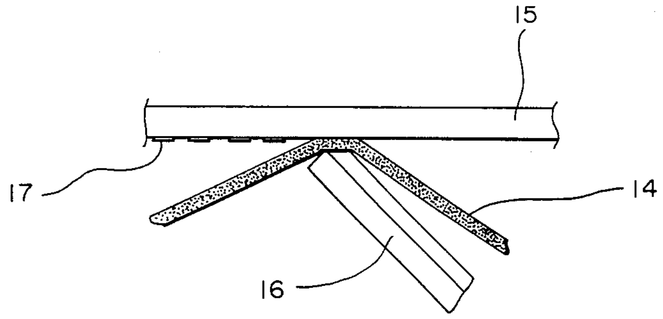
Figure 5A:
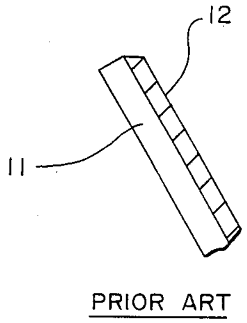
Figure 5B:
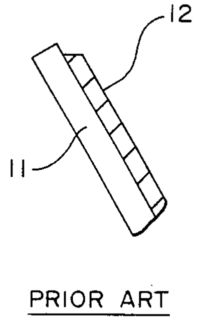
Figure 6A:
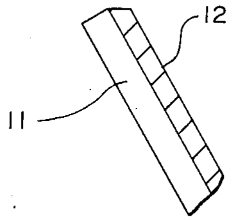
Figure 6B:
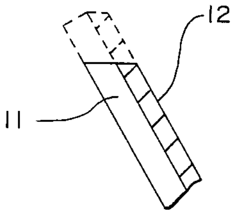

The accompanying drawings, which are incorporated in and form a part of the specification, illustrate embodiments of the present invention and, together with the description, serve to explain the principles of the invention. In the drawings:

FIG. 1 is a plan view of a multi-stylus recording head manufactured by a method of the present invention, FIG. 2 is a perspective view showing the substrate structure of a recording head according to the present invention, FIG. 3 is a plan view of another recording head embodying the present invention, FIG. 4 is a side view showing how printing is effected by a recording head, FIGS. 5-A and 5-B are sectional views of the end section of a prior art recording head, and FIGS. 6-A and 6-B are sectional views of the end section of a recording head embodying the present invention.

In FIG. 1 which is a plan view of a multi-stylus recording head manufactured by a method embodying the present invention, numeral 1 indicates a ceramic substrate and numeral 2 indicates a plurality of electrode films covering this ceramic substrate 1. To manufacture this recording head, a paste is prepared with a pulverized electrode material, a binder, a solvent, etc. and an electrode pattern 2 is formed by a thick-film printing method on a ceramic substrate which has not been sintered. Next, this ceramic substrate with thick-film printing is fired at an elevated temperature in a reductive atmosphere. The aforementioned ceramic substrate 1 and the electrode pattern 2 are thereby sintered to produce a part of a recording head. Such a recording head can be used not only in a transfer printer of the type described above but also in a conventional type of recording apparatus by electrical discharge.

Next, there will be described a method of manufacturing a recording head with stronger support for the electrodes according to a second embodiment of the present invention. FIG. 2 is a perspective view showing the substrate structure of a recording head wherein numeral 11 is a ceramic layer, for example, of alumina and numeral 12 is an electrode material layer, for example, of tungsten. To manufacture a substrate of a two-layer structure like this, a paste made of an electrode material such as tungsten in a powder form, a binder, a solvent, etc. is used to cover an unsintered ceramic layer 11 to a predetermined thickness by a printing or similar process and it is sintered at an elevated temperature in a reductive atmosphere. If the sintering of the ceramic material and firing of the electrode material are thus carried out simultaneously in a single process, an intermediate diffusion layer is formed between the ceramic layer and the electrode material layer such that the bonding between them becomes strong, or a substrate with improved strength can be obtained.

After the firing process explained above, unnecessary portions of the electrode material layer 2 are removed by a well known method such as photoetching or laser irradiation and a desired electrode pattern is obtained. FIG. 3 is a plan view of a recording head substrate thus manufactured.

Compared to the conventional manufacturing methods, the method described above can improve the bonding strength of the electrodes by a factor of 100 or more. The problem of weakly supported electrodes which fall off easily can thus be obviated, and reliability of the products improves significantly. Moreover, the process of forming an electrode material layer is much simplified and the manufacturing costs can be reduced.

The use of a hard alumina ceramic material as the substrate, however, gives rise to the following problem. As shown in FIG. 4, printing is generally effected by compressing a transfer film against a sheet of recording paper 15 by means of a recording head 16 and depositing ink 17 on the recording paper 15. If a hard material such as aluminum (Vickers hardness about 1700) is used as the substrate, therefore, the tungsten electrode material at the end portion is worn out as the recording head 16 keeps moving under a compressed condition. Thus, the end portion of the tungsten electrode material becomes deformed after a long use from the original shape shown by FIG. 5-A to a deformed shape shown by FIG. 5-B, with a step-like formation appearing between the alumina layer 11 and the tungsten electrode layer 12. As a result, the contact of the recording head becomes less accurate, the quality of printing deteriorates and the lifetime of the electrode is adversely affected. It is therefore an additional object of the present invention to prevent deterioration of printing quality caused by abrasion of the end portion of the recording head.

FIG. 6-A is a cross-sectional view of a recording head according to a third embodiment of the present invention. FIG. 6-A shows the condition before the recording head is used and FIG. 6-B shows the condition after it has long been used for printing. In these figures, the same numerals 11 and 12 as used before are used to indicate corresponding parts. According to this embodiment of the present invention, however, the ceramic layer 11 is of a material with hardness nearly equal to that of the electrodes 17 having tungsten as the principle constituent. Since the Vickers hardness of tungsten is 600 to 800, forsterite with hardness about 800, mullite with hardness about 700 and micaceramics (containing $SiO_2$, $Al_2O_3$, MgO, $K_2O$, $B_2O_3$ and F) with hardness of about 650 may be appropriate. The hardness of the ceramic layer 11 may actually be less than the Vickers hardness of tungsten. Materials with hardness equal to or greater than 200 are generally acceptable. Any conventional method may be used for covering any of these ceramic layers 11 with the electrode layer 12 having tungsten as its principal constituent. Since mica ceramics have different sintering temperatures from that of tungsten, these two layers cannot be sintered simultaneously. The covering process, therefore, must be effected by adhesion.

Abrasion rates of tungsten and ceramic materials were measured by an abrasion tester with abrasive paper with grain size No. 150 and rubbing frequency of 50 times. The amount of abrasion was 6 μm with forsterite, indicating that forsterite is a preferable material, and 0.5 μm with alumina, indicating that alumina is less preferable.

If a substrate material of the present invention is used, there will not appear any step-like cross-sectional form of the recording head even after a long use. Instead, the cross-sectional shape will change as shown in FIG. 6-B. This prevents deterioration in the contact by the recording head and improves the useful life of the head.

The foregoing description of preferred embodiments of the present invention has been presented for purposes of illustration and description. It is not intended to be exhaustive or to limit the invention to the precise form disclosed, and obviously many modifications and variations are possible in light of the above teaching. For example, the present invention relates not only to thermal recording heads but also to recording heads of printers of heat-sensitive recording type which cause electrodes to contact the resistive layer of a film to make a color appear on a heat-sensitive sheet of paper in contact with the conductive layer of the same film by causing currents to pass therethrough or of discharge recording type. The principal component of the electrode need not be tungsten but may be a combination of tungsten and molybdenum. In summary, any such modifications and variations which may be obvious to a person skilled in the art are intended to be included within the scope of this invention.

What is claimed is:

1. A multi-stylus recording head of a printer comprising a ceramic substrate with hardness nearly equal to or less than that of tungsten, a multi-electrode pattern containing tungsten as principal component thereof, and an intermediate diffusion layer formed between said multi-electrode pattern and said ceramic substrate to provide strong bonding therebetween.

2. The recording head of claim 1 wherein said ceramic substrate is of forsterite.

3. The recording head of claim 1 wherein said ceramic substrate is of mullite.

4. The recording head of claim 1 wherein said electrode pattern further contains molybdenum.

* * * * *